United States Patent [19]
Drucker

[11] Patent Number: 5,511,110
[45] Date of Patent: Apr. 23, 1996

[54] CELLULAR PHONE PAGE SYSTEM USING SEQUENTIAL TRANSMISSIONS OF PAGES OVER A TIME-PARTITIONED FORWARD CONTROL CHANNEL

[75] Inventor: Elliott H. Drucker, Kirkland, Wash.

[73] Assignee: U S WEST, Inc., Englewood, Colo.

[21] Appl. No.: 336,816

[22] Filed: Nov. 9, 1994

[51] Int. Cl.$^6$ ................................................ H04M 11/00
[52] U.S. Cl. .......................................... 379/57; 370/95.1
[58] Field of Search ............................ 379/57; 370/85.4, 370/85.5, 95.1, 95.3

[56] References Cited

U.S. PATENT DOCUMENTS

| | | | |
|---|---|---|---|
| 5,150,361 | 9/1992 | Wieczorek et al. | 370/95.1 |
| 5,396,496 | 1/1994 | Ito et al. | 379/59 |

*Primary Examiner*—Curtis Kuntz
*Assistant Examiner*—Lisa Coward
*Attorney, Agent, or Firm*—Brooks and Kushman

[57] ABSTRACT

A cellular phone paging system that uses a frame oriented scheme to transmit and receive mobile unit pages with reduced delay is disclosed. Each mobile unit in the cellular phone network is assigned a paging slot within the frames on the forward control channel. If a plurality of pages are to be sent along the forward control channel and the pages are assigned to the same paging slot, the pages will be transmitted in successive paging slots beginning with the assigned slot rather than in the assigned slot in a series of sequential frames. In order to receive its pages, a mobile unit inspects its assigned paging slot and the next sequential paging slots if its assigned paging slot has been filled with a page request to another unit. The mobile unit continues to check sequential paging slots until it identifies a page to itself or identifies an empty slot. The mobile unit may reduce its power consumption by turning off some of its electronic circuitry while not monitoring the contents of its assigned slot and, if necessary, the contents of successive slots. In this manner, paging delays between base stations and mobile units are reduced to a minimum while maintaining idle mode power consumption conservation provided by frame-based paging schemes.

7 Claims, 4 Drawing Sheets

CELLULAR PHONE PAGE SYSTEM USING SEQUENTIAL TRANSMISSIONS OF PAGES OVER A TIME-PARTITIONED FORWARD CONTROL CHANNEL

TECHNICAL FIELD

This invention relates generally to cellular phone networks. More particularly, the present invention relates to a system for paging mobile units operating within a cellular phone network.

BACKGROUND ART

The use of cellular mobile telephones or mobile units is becoming increasingly common as the cost of these devices decrease. Mobile units can be divided into two major classifications: automobile-mounted units and fully portable handheld units. The operation of both types of mobile units within a prior art cellular phone network can be seen in FIG. 1, where the mobile units 11 and 13 may be placed in contact with other mobile units, or land line telephones via a Public Switched Telephone Network (PSTN) 15, by means of the cellular phone network 17. The cellular phone network 17 is comprised of a plurality of base stations 19 and one or more mobile telephone switching offices (MTSO) 21. Each base station 19 provides radio communication contact with the mobile units within a geographical area known as the base station coverage area 23. In sum, a cellular system can be thought of as one or more MTSOs 21, a plurality of base stations 19, and any number of mobile units, of which 11 and 13 are typical, that use the network. Generally, each of these components includes computerized controls in the form of hardware and/or software.

When a telephone call to a called mobile unit originates from either the PSTN 15 or a calling mobile unit within the cellular network, the caller must first access the cellular phone network 17. This is accomplished by dialing the called mobile units unique identification number, commonly known as its phone number. The MTSO 21 receives the call request and instructs a central call processor 25 to commence with call processing. The central call processor 25 instructs each of the base stations 19 to transmit a page in order to locate the mobile unit, e.g., mobile unit 11. A page is a signal that alerts a particular mobile unit that is being called. A page to one mobile unit is different in content from a page to any other mobile unit. For example, a page typically contains the paged mobile unit's identification or phone number. In this manner, pages to a particular mobile unit can be identified.

Each base station transmits the page on one or more dedicated forward control channels that carry all pages, as well as control signals, channel assignments, and other overhead messages to each mobile unit. The forward control channel is distinct from the other radio channels, which actually carry the voice communications between a mobile unit and another mobile unit or a land line telephone. Each base station may have more than one forward control channel upon which pages can be carried. For clarity however, this discussion will assume that each base station has one forward control channel.

Because a plurality of base stations are broadcasting at the same time, mobile units operating in the cellular system, and not currently engaged in a telephone call, a state typically referred to as being idle, will tune only to the strongest available forward control channel and monitor that channel for a page or other message directed to it. Upon determining that a page message is directed to it, mobile unit 11 again scans all forward control channels so as to select the base station transmitting the strongest signal. The mobile unit than transmits an acknowledgment message along a reverse control channel associated with the strongest forward control channel. This acknowledgment message serves to indicate to the MTSO 21 which of the several forward control channels (associated with the several base stations 19) to use for further call processing communications with mobile unit 11. This further communication typically includes a message sent to the mobile unit instructing it to tune to a particular voice channel for completion of call processing and for connection with the calling party.

It can be appreciated that in the cellular phone network described above, an idle mobile unit must constantly monitor pages transmitted on the forward control channel from the base stations in order to receive calls. This activity is necessary since messages addressed to a particular mobile unit may occur at essentially any point in the forward channel data stream. For the system to function satisfactorily, a mobile unit must be able to detect all pages addressed to it. Thus, idle mobile units must be "on" all the time, i.e., their electronic circuitry associated with receiver and baseband processing functions must be powered up continuously during idle mode. This power requirement arises from the high-speed digital modulation schemes used by cellular phone networks and known to those with skill in the art.

In the case of automobile-mounted units, power consumption is not a critical consideration since the automobile battery provides an adequate source of power. However, for the fully portable handheld mobile units with self-contained batteries, this power consumption may be highly undesirable since it limits idle mode battery life.

The general problem of reducing power consumption in a mobile unit while in idle state has been recognized for some time. Prior attempts to address this problem have resulted in varied solutions. However, the bulk of these solutions can be characterized as systems which organize the forward control channel data stream such that it consists of an infinite series of concatenated frames. Such systems are designed to lower the mobile unit power consumption during certain intervals by inactivating most high-power consumptive circuits. These intervals are referred to as the OFF periods or modes. During an OFF period, only a small timing circuit is active. This timing circuit is synchronized with the transmissions on the forward control channel being monitored. The mobile unit is periodically switched ON according to the state of the timing circuit to check for pages. If a page is recognized during an ON period, the mobile unit remains active until the call is completed.

To allow mobile units to only periodically monitor the control channel, each base station broadcasts frames of information on the forward control channel, each frame having an identical time span. This is called a frame oriented scheme. Every frame broadcast on a given control channel has precisely the same structure, i.e., each frame contains a unique data sequence, which those skilled in the art generally refer to as the "synchronization word", that is sent at precisely the same location in each frame. Typically, but not necessarily, the synchronization word is positioned at the beginning of each frame. The purpose of the synchronization word is to provide frame timing synchronization to mobile units receiving paging signals on the forward control channel. Within each of these frames are time slots, which are segments delineated by time during which data, such as a page, may be placed on the frame. Each frame may include control slots, which contain overhead messages and synchronization information, and a number of paging slots, which carry the actual pages. Each of the paging slots are located at a precisely defined time location with respect to the synchronization word.

In this prior art approach, each mobile unit in the cellular phone network is assigned a paging slot within the frames to receive its pages. Because there are a limited number of paging slots in each frame, it can be appreciated that each paging slot will have many mobile units assigned thereto. Each mobile unit, by virtue of some function program within it, is assigned to one, and only one, of these paging slots. This assignment for each mobile unit, which is often derived from a mobile unit's identification number, is also known to the system transmitting the paging channel. In practice, each of the paging slots may have tens of thousands of mobile units assigned to it. In operation, each mobile unit matches its identification number against the content of a page in its assigned paging slot to determine if the page is directed to it, or if the page is to another unit. Once a mobile unit is synchronized precisely with the base stations broadcasting of the frames, the mobile unit need only monitor the forward control channel during its assigned paging slot time period in each frame. During the remainder of each frame, the mobile unit may be in OFF mode to save power.

This type of message sending protocol is described in detail in U.S. Pat. No. 4,713,808. In this prior art improvement, when a message is sent to a particular mobile unit, rather than sending it at a random time, it is inserted into the mobile unit's assigned paging slot. As a result, each idle mode mobile unit receiving the paging channel, once it has required synchronization timing by receiving a synchronization word, can only monitor its assigned paging slot. At other times, the mobile unit may "turn off" its electronic circuitry with the exception of that required to maintain timing. This is commonly referred to by those skilled in the art as a mobile unit "sleep mode". The mobile unit "wakes up" in time to receive its assigned paging slot, then "goes back to sleep" if it receives no message in that slot.

While this prior art improvement greatly extends battery life, it nonetheless results in substantial and undesirable delays in transmission to the mobile units. More particularly, it is often the case that a paging channel needs to send messages for several mobile units at essentially the same time. If some of these messages are for mobile units that are assigned the same paging slot, there is no alternative but to send the messages in successive frames, thus delaying the transmission. As those skilled in the art will recognize, this results since each paging slot can only contain one page. In operation, one page is chosen, and the remainder of the pages for that paging slot will "stack up" at the base stations. This causes conflicting pages to be delayed one or more frame periods. As an example, given that a nominal frame length is approximately one second, and assuming that there are five pages to be sent to five different mobile units assigned a common paging slot, this paging method would cause a delay of five seconds before the last mobile unit is paged. This length of delay is undesirable.

Consequently, a need has developed for a method and system for overcoming the limitations of the prior art, and in particular, decreasing the response time of called mobile units while maintaining the power conservation that is so important in a portable unit. While the use of paging time slots has been broadly disclosed in the prior art on a time-domain multiplex communications channel, see for example U.S. Pat. No. 4,777,633 to Fletcher, the prior art does not teach or suggest the use of paging slots on a control channel, as disclosed herein by applicant.

SUMMARY OF THE INVENTION

In accordance with this invention, a method and apparatus for improving the power conservation of cellular mobile units while decreasing mobile unit paging delay is disclosed, The method includes partitioning the forward control channel into time frames. Each frame includes paging slots that will be monitored by a set of assigned mobile units. Following initial frame synchronization; a mobile unit is in ON mode monitoring the forward control channel when its assigned slot is broadcast. If a page directed to the mobile unit appears in the unit's assigned slot, the mobile unit remains in ON mode and continues with call processing. However, if the mobile unit's assigned slot contains a page to a different mobile unit, in accordance with the present invention, the mobile unit will continue monitoring the slots sequentially following its assigned slot until either an empty slot is detected or a page to the mobile unit is received. If an empty slot is detected, the mobile unit switches to OFF mode since it did not receive a page. In this manner, multiple pages to distinct mobile units assigned to the same paging slot can be sent in a single frame or in sequential frames, thereby precluding multiple frame page delays.

BRIEF DESCRIPTION OF THE DRAWINGS

The foregoing aspects and many of the attendance advantages of this invention will become more readily appreciated as the same becomes better understood by reference to the following detailed description, when taken in conjunction with the accompanying drawings, wherein.

BEST MODE FOR CARRYING OUT THE INVENTION

Figure 1:
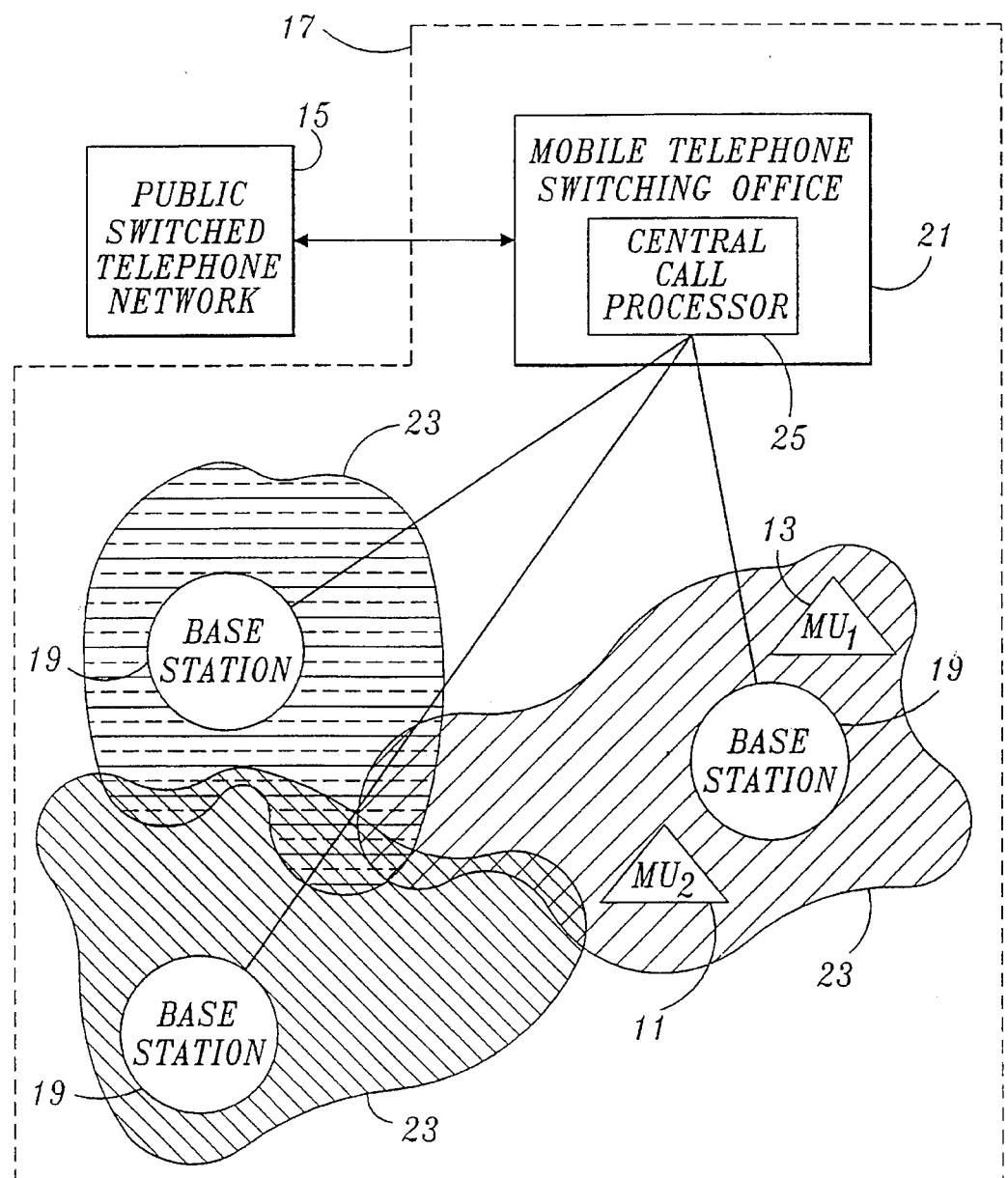
FIG. 1 is a pictorial representation of a prior art cellular phone system.

As noted, power consumption is a major consideration in the operation of some mobile units in a cellular phone network. Thus, one primary goal of the present invention is to conserve battery consumption by a mobile unit operating in a cellular phone network in idle mode without imposing undue delay in page processing. The prior art conserved power by using a frame oriented scheme to transmit pages. This method allowed idle mobile units to be in an OFF mode during a specified period, thus conserving power. However, one difficulty with the prior art is that call processing delays result. The present invention provides a system that reduces paging frame delays when more than one page assigned to a single paging slot is to be sent in a given frame. The paging system of the present invention transmits pages for mobile units, which are assigned to the same paging slot, sequentially within a frame beginning with the assigned paging slot. In conjunction, each mobile unit is controlled to remain in an ON mode beginning with its assigned paging slot until a page for that mobile unit or an empty paging slot is recognized. Thus, if no page is recognized when the mobile unit is on, it is switched to an OFF mode to conserve energy during the remainder of the frame period. The system of the present invention can be implemented by modifying the control hardware and/or software at an MTSO, a set of base stations and a mobile unit within a cellular system.

Because the system of the present invention primarily concerns paging signals transmitted between base stations and mobile units, it is beneficial to summarize the types of communications between a base station and a mobile unit before describing the invention in detail. Communications between base stations and the mobile units are of two general types. The first type of communications are control communications, whereby a base station and a mobile unit converse with regard to network parameters, geographic location, and other overhead-type messages. The second type of communications are the actual voice and/or data communications between a mobile unit and a caller.

As noted earlier, the present invention is concerned with control communications. These control communications are transmitted primarily on a forward control channel and a reverse control channel. The forward control channel carries communications transmitted from a base station to a mobile unit. The reverse control channel carries communications transmitted from a mobile unit to a base station. One important function of the forward control channel is to carry the pages to the mobile units. These pages include the mobile units' phone numbers or other unique identifying number. Throughout the following description, the pages that are referred to are those transmitted by base stations to mobile units via the forward control channel.

Returning to the description of the present invention, communications between the base stations and the mobile units may be organized in frame structure as described above. The forward control channel thus carries discrete frames of information, each frame being of the same temporal length and containing the same configuration of information. These frames are concatenated to form a continuous stream of information.

Figure 2:
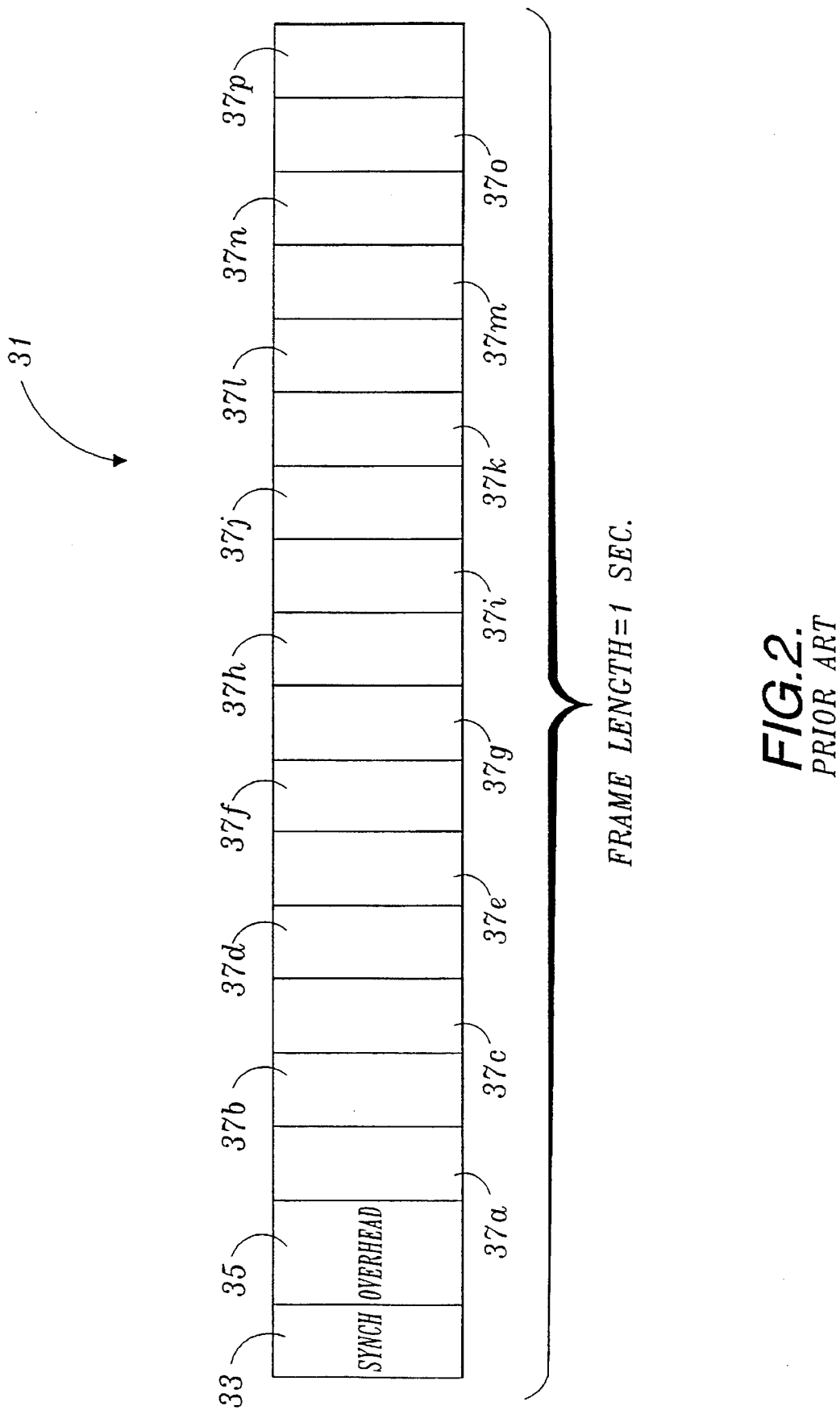
FIG. 2 is a schematic diagram of a prior art forward control channel frame.

Referring to FIG. 2, a frame structure in the prior art has a frame 31 of frame length=1 second. The frame 31 is comprised of a plurality of slots. A slot is delineated as a time segment of a frame within which data can be carried. A frame synchronization and channel ID slot (sync slot) 33 is at the beginning of the frame 31. The sync slot 33 carries timing information to be used by mobile units in order to synchronize their timing with the base station forward control channel broadcast timing. An overhead slot 35 immediately follows the sync slot 33. The overhead slot 35 can contain overhead messages that define system parameters or control signals that instruct specific mobile units already involved in call processing to take certain actions, e.g., change frequency.

The remainder of the frame 31 is comprised of paging slots 37a–p, which generally contain the pages broadcast from the base stations. Each mobile unit in the network is assigned a paging slot in the frame structure. Because there are a limited number of paging slots in each frame, in most systems each paging slot will have a large number of mobile units assigned thereto. The assignments are somewhat arbitrary; however, each paging slot should be assigned to a nearly equal number of mobile units. This criteria is based on the premise that in a large population equal numbers of mobile units will, on average, receive approximately the same number of calls. The process of assigning paging slots may take several forms, including, but not limited to, defining a fixed relationship between a mobile's phone number and its paging slot number.

It can be appreciated that the number of paging slots present in any frame configuration is flexible and is, to a certain extent, dependent upon the frame length. A particular frame structure is also dictated by cellular system parameters such as bit transmission rate and page size. For example, in one existing protocol, each page to a mobile unit requires 486 bits. With a forward control channel transmission rate of 10,000 bits/sec, each page requires 48.6 milliseconds to transmit. Thus, if a frame is one second in length and two-tenths of a second is allocated for synchronization and overhead messages, this leaves 800 milliseconds for the paging slots. This available time will accommodate approximately 16 paging slots, each 50 milliseconds in length. Once a frame structure is established in a particular cellular phone system, all frames will have the identical structure.

In most cellular systems, the paging slots can carry four types of messages. The first type is a page. The second type is a filler message that indicates that no substantive message is being sent (also known as an "empty slot"), but which occupies the slot so as to retain frame timing. The third type of message indicates the status of various global parameters. Finally, the fourth type of message is a mobile control message. These mobile control messages include voice channel assignment, reorder, and other messages addressed to a particular mobile unit as part of call processing other than paging. The mobile unit's response to each of these types of messages is described below.

Generally, during call processing, a MTSO receives a call request and originates a message instructing the base stations to transmit a page to the called mobile unit on the forward control channel. Residing within the base station is a controller. The controller formulates the frames to be sent on the forward control channel in accordance with the chosen frame structure, including determining the contents of each frame. The controller is known and is used in prior art frame oriented transmission systems to formulate the frames to be transmitted. The controller typically resides in the base station, but might also reside wholly or in part within the MTSO or, conceivably, within some other structure within the cellular system. Generally, each forward control channel has its own controller, but some cellular systems might be configured so that each controller is associated with a plurality of forward control channels or, alternatively, that a single controller controls the transmissions on all forward control channels in the system. In any case, each forward control channel is related to a controller that receives instruction from the MTSO. The instructions include indications as to what messages are to be transmitted on that forward control channel.

The controller places a page in a frame, in accordance with instructions from the MTSO, in the assigned paging slot for the called mobile unit or in a succeeding paging slot if the assigned slot is already filled with a page to another mobile unit. The frame is then transmitted by the base station. Assuming that the called mobile unit is operating in the cellular system, and is in idle state, and is monitoring the forward control channel, it will have synchronized itself to the frame timing of that channel. During each frame transmitted on the forward control channel, the called mobile unit monitors its assigned paging slot. If its assigned paging slot contains a page to another mobile unit, it monitors each successive paging slot, including, if necessary, paging slots in successive frames, until one of the slots contains a page for it or no page. The combination of the transmittal procedure on the forward control channel, and the mobile unit's page monitoring procedures make up the system of the present invention.

Figure 3:
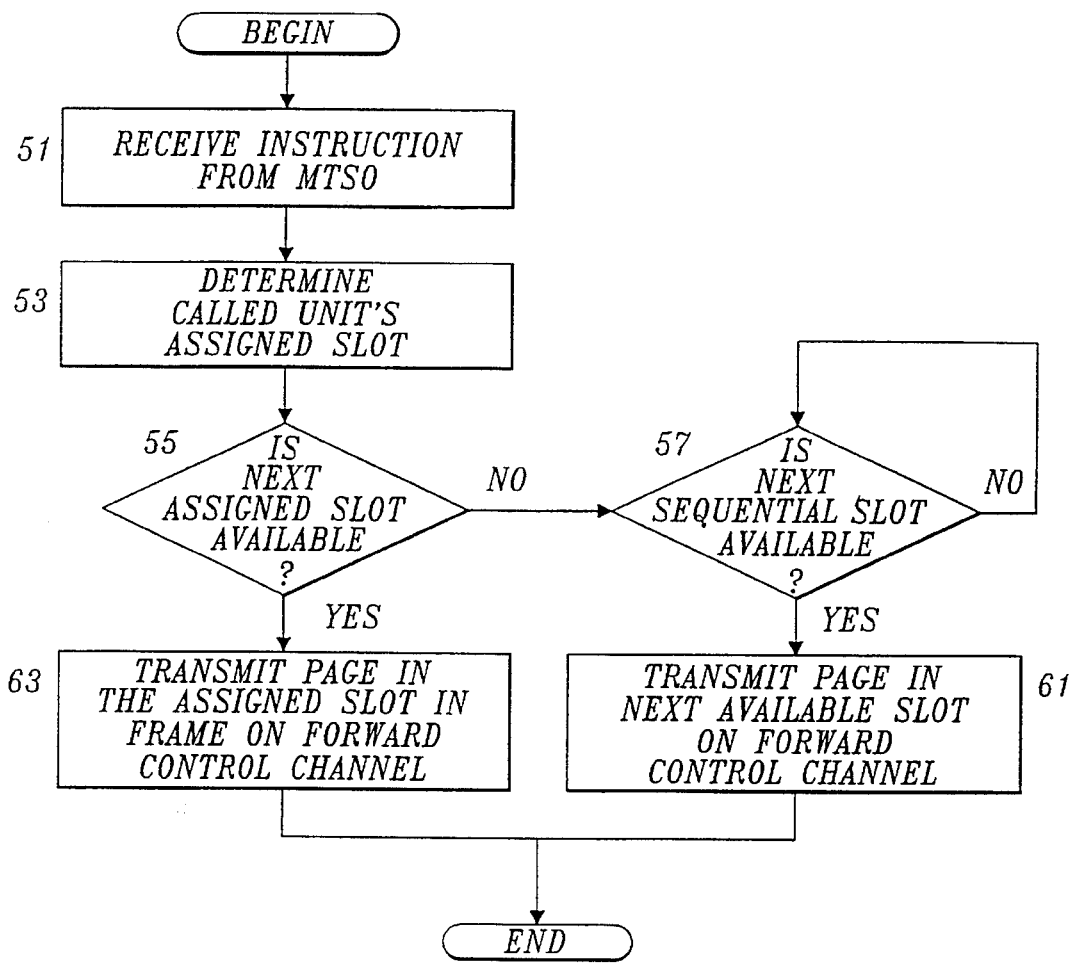
FIG. 3 is a flow diagram of a page sending procedure in accordance with the present invention.

Next the method of transmitting a page is illustrated in detail with reference to FIG. 3. It can be appreciated that only a single forward control channel for one base station is described and that other base stations in the system would execute a similar procedure. Assuming that the MTSO has received a page for a mobile unit, the MTSO sends a message instructing the controller to transmit a page to the called mobile unit. At box 51, the controller receives the page instruction from the MTSO. At box 53, the controller determines the paging slot 37a–p that the called mobile unit is assigned. This determination may be based on a data base contained within the controller, a deduction based upon the mobile unit's identification number, or information provided by the MTSO as part of the instruction received at box 51. At box 55 the controller attempts to place the page in the assigned paging slot of the next frame. The controller may receive several page instructions within a given frame period for mobiles assigned to the same paging slot. Thus, at box 55, for each page, the controller determines if the assigned paging slot for that particular called mobile unit is available or already "reserved" for another page. If the assigned paging slot is available, at box 63, the controller places the page into the assigned paging slot. When it is time to transmit the next frame it is transmitted on the forward control channel.

However, if the next assigned paging slot is unavailable, i.e., already reserved for another page, at box 57, a check is made by the controller to determine whether the next paging slot sequentially following the assigned paging slot is available. For example, if paging slot 37c is the assigned slot, the next sequential slot is paging slot 37d. If the next sequential paging slot is available, then at box 61 the controller places the page in that next sequential paging slot. However, if the paging slot following the assigned paging slot is unavailable, then the next sequential paging slot is checked for availability. This step at box 57 is repeated until an available paging slot is found, even if the next available slot is in the next frame, i.e., the next sequential paging slot following paging slot 37p is paging slot 37a of the next frame. Thus, each page request is placed in the next available paging slot sequentially following the assigned slot. In this manner, the controller does not store multiple pages to a particular assigned slot and send only one such page per frame, but rather places each page in a frame paging slot as soon as possible. Moreover, the controller may place, in otherwise unoccupied paging slots, global parameter change messages or mobile control messages. In each remaining unoccupied paging slot, a filler message is placed to indicate that the slot is empty.

Figure 4:
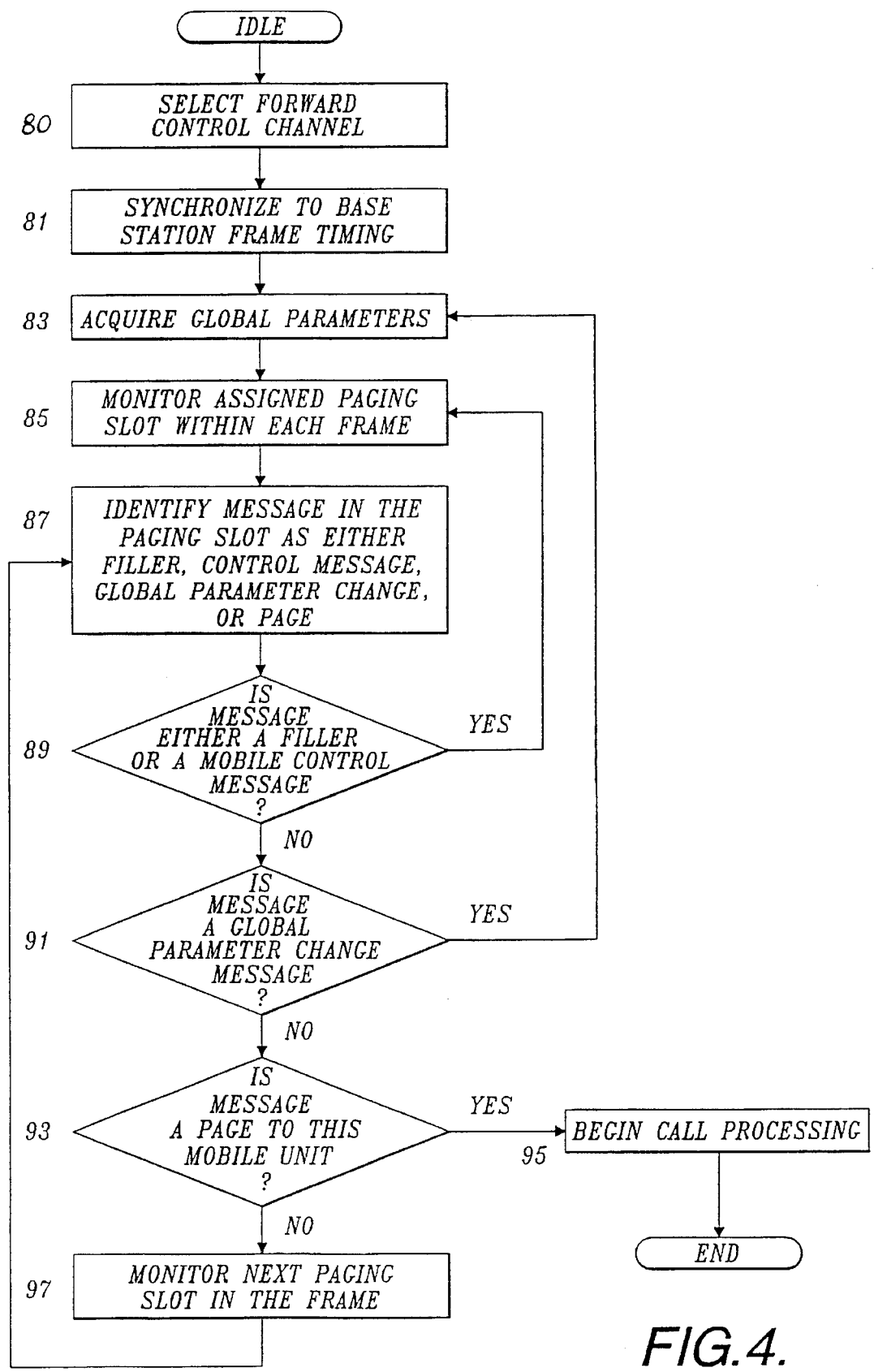
FIG. 4 is a flow diagram of a page receiving procedure in accordance with the present invention.

Referring to FIG. 4, the procedure by which a mobile unit monitors a forward control channel for pages is shown. At box 80, a mobile unit in idle state selects a forward control channel to monitor by means known in the prior art. At box 81, the mobile unit synchronizes its internal frame clock to the frame synchronization transmitted on the forward control channel by the base station. At box 83, the mobile unit acquires from the forward control channel the global parameters that are required for normal operation. Although not shown, it will be appreciated that, while the mobile unit is acquiring global parameters at box 83, it may also be monitoring the forward control channel for any pages directed to it.

At box 85, the mobile unit will be in ON mode and monitoring the forward control channel during that time period in which its assigned paging slot is being transmitted. All of these steps are known in prior art systems. At box 87, the mobile unit determines the type of message filling its assigned paging slot, i.e., filler, mobile control message, global parameter change, or page. If the message in the paging slot is a filler (an empty slot) or a mobile control message, at box 89 the procedure returns to box 85 and scans its assigned paging slot in the next frame. Although not shown, the mobile unit may cycle through an OFF period prior to the next scan.

At box 91, a determination is made as to whether the message in the assigned paging slot is a global parameter change message. If so, the mobile unit returns to box 83 and stays in ON mode until the necessary global parameters have been acquired. At box 93, the message in the paging slot is determined to be either a page to that mobile unit or a page to another mobile unit. A page to a particular mobile unit is unique in that the content of the page contains the mobile unit's identification and/or other unique number. In this manner, a mobile unit can identify pages directed to itself. If the page is to the particular mobile unit, the mobile unit will begin call processing at box 95 in accordance with methods known in the prior art.

If the message is not a page to that mobile unit, then it must be a page to another mobile unit. Thus, at box 97, the mobile unit remains in ON mode and monitors the next paging slot in that frame. If the paging slot examined at boxes 87–93 is the last paging slot in a frame, then at box 97 the mobile unit will monitor the first paging slot in the next frame. The process then returns to box 87 to analyze the contents of that paging slot. The loop between box 87 and 97 continues until the mobile unit exits the loop at box 89, 91 or 93. The procedure illustrated in FIG. 4 is continued indefinitely until the mobile unit ceases to monitor the forward control channel for one of various reasons known in the prior art. In view of the foregoing, it can be seen that the present invention overcomes the disadvantages of the prior art by providing a "sliding slot" paging scheme. In accordance with the inventions, messages for a particular mobile unit are, as before, transmitted in their assigned paging slots. However, in contrast to the prior art, if the slots are already occupied, the forward control channel will attempt to insert the message in the next successive slot with the same frame, or, if the assigned slot was the last in a frame, the first slot of the next succeeding frame. If this next successive slot is already occupied, the message will be sent in the next unoccupied slot. As a result, the mobile units will "wake up" for their assigned slot times. If a particular mobile unit observes a message in its assigned slot not addressed to it, it will "remain awake" for the next slot, and succeeding slots, until it receives one that is either unoccupied or that contains a message for that mobile unit.

While preferred embodiments of the invention have been illustrated and described, it will be appreciated that various changes can be made therein without departing from the spirit and scope of the invention. For example, while the specification describes a specific frame structure, it can be appreciated that other frame structures can be used. Moreover, while the discussion above suggests that the function of page messages are to indicate to the called mobile unit that it has an incoming call, it can be appreciated that a message that occupies a paging slot, and is directed to a unique mobile unit, may serve some function other than to indicate an incoming call. Thus, the invention can be practiced otherwise than as specifically described herein.

What is claimed is:

1. For use in a wireless telephone network including a call processing system operative to communicate with mobile units on a forward control channel by transmitting control signals in a series of concatenated frames having a plurality of paging slots, each of said paging slots having a corresponding plurality of mobile units assigned thereto, a method of transmitting pages to a mobile unit, comprising:

determining the assigned paging slot for said mobile unit;

beginning with next occurrence of said assigned paging slot in a frame, determining if said slot is available;

if said assigned paging slot is not available, sequentially checking each successive paging slot in said frame for availability;

placing said page in a first available paging slot; and transmitting said frame.

2. The method of claim 1, wherein the call processing system includes a mobile telephone switching office, at least one base station and at least one controller.

3. For use in a wireless telephone network including a call processing system operative to communicate with mobile units on a forward control channel by transmitting control signals in a series of concatenated frames having a plurality of paging slots, each of said paging slots having a corresponding plurality of mobile units assigned thereto, an improved system for transmitting a page to a mobile unit, comprising:

a Mobile Telephone Switching Office (MTSO);

at least one base station in electrical communication with said MTSO and said plurality of mobile units;

at least one controller in electrical communication with said MTSO and said base station, said controller operative to: (a) determine the assigned paging slot for the mobile unit; (b) determine if the slot is available in its next occurrence in a frame; (c) sequentially check each successive paging slot in the frame for availability if the assigned slot is not available; and (d) place the page in a first available paging slot; and a transmitter for transmitting the frame of said placed page on the forward control channel.

4. A method of receiving a page by a mobile unit in a cellular phone network using a call processing system, the call processing system communicating with the mobile unit by transmitting control signals on a forward control channel in a series of concatenated frames in accordance with a frame oriented scheme, each frame including a plurality of paging slots that are available or unavailable, each of the paging slots having a plurality of mobile units assigned thereto, wherein a mobile unit has an assigned paging slot, and said mobile unit has an ON mode during which it can receive control signals and into which it is placed when the assigned slot is transmitted on said forward control channel, the method comprising the steps of:

(a) beginning with a mobile unit's assigned paging slot, checking the content of said paging slot; and (b) for said paging slot:

(i) if said paging slot contains a page for said mobile unit then processing said page;

(ii) if said paging slot contains a page for a different mobile unit, then checking the content of the next sequential paging slot and repeating step (b).

5. A method as claimed in claim 4, further including the step of placing said mobile unit into an OFF mode if said paging slot is empty.

6. An apparatus for receiving a page, the apparatus integrated into a mobile unit, wherein the mobile unit operates within a cellular phone network using a call processing system, the call processing system communicating with the mobile unit by transmitting control signals on a forward control channel in a series of concatenated frames in accordance with a frame oriented scheme, each frame including a plurality of paging slots that are available or unavailable, each of the paging slots having a plurality of mobile units assigned thereto, wherein the mobile unit has an assigned paging slot, and the mobile unit has an ON mode for monitoring the forward control channel for control signals during a time period in which its assigned paging is being transmitted, the apparatus comprising:

(a) a receiver for receiving said control signals;

(b) means for determining the content of a paging slot;

(c) means for determining if said paging slot contains a page for a different mobile unit and, if it does, for maintaining the mobile unit for remaining in ON mode and sequentially checking each paging slot in a series of concatenated frames; and (d) means for processing a page if said paging slot contains a page for said mobile unit.

7. An apparatus as claimed in claim 6, further including means for placing said mobile unit into an OFF mode if said paging slot is empty.

* * * * *